United States Patent
Caro et al.

(10) Patent No.: US 8,088,345 B2
(45) Date of Patent: *Jan. 3, 2012

(54) OLEFIN PRODUCTION FURNACE HAVING A FURNACE COIL

(75) Inventors: Colin G. Caro, London (GB); Philip L. Birch, Chiddingfold (GB); William Tallis, Warwickshire (GB)

(73) Assignee: Technip France S.A.S., Courbevoie (FR)

( * ) Notice: Subject to any disclaimer, the term of this patent is extended or adjusted under 35 U.S.C. 154(b) by 606 days.

This patent is subject to a terminal disclaimer.

(21) Appl. No.: 11/575,730

(22) PCT Filed: Sep. 21, 2005

(86) PCT No.: PCT/GB2005/003632
§ 371 (c)(1),
(2), (4) Date: Apr. 23, 2008

(87) PCT Pub. No.: WO2006/032877
PCT Pub. Date: Mar. 30, 2006

(65) Prior Publication Data
US 2008/0257436 A1    Oct. 23, 2008

(30) Foreign Application Priority Data

Sep. 21, 2004 (GB) .................. 0420971.4

(51) Int. Cl.
B01J 8/00 (2006.01)
C10G 9/14 (2006.01)
(52) U.S. Cl. ........ 422/659; 422/655; 422/198; 422/205; 422/214; 208/132; 585/921
(58) Field of Classification Search .................. 422/196, 422/197, 198, 205, 214, 655, 659; 208/132; 585/921
See application file for complete search history.

(56) References Cited

U.S. PATENT DOCUMENTS

| 85,149 A | 12/1808 | Van Amringe |
| D16,763 S | 3/1857 | Watson |
| 892,919 A | 7/1908 | Wedgefuth |
| 1,363,416 A | 12/1920 | Hooker |

(Continued)

FOREIGN PATENT DOCUMENTS

AU    77718/75    8/1976

(Continued)

OTHER PUBLICATIONS

Written Opinion in PCT/GB04/001163 filed Jun. 23, 2004.

(Continued)

*Primary Examiner* — Walter D Griffin
*Assistant Examiner* — Lessanework Seifu
(74) *Attorney, Agent, or Firm* — Marshall, Gerstein & Borun LLP

(57) ABSTRACT

The present invention relates to piping (1) for use in industrial activities, where the piping (1) has a specific geometry. In particular, the piping (1) is formed as a lowamplitude helix, which causes fluid flowing through the piping (1) to swirl. This swirl flow provides a large number of advantages. Particular applications where the piping (1) can be used include petroleum production risers and flowlines, production tubing for downhole use in wells, pipelines for the transportation of fluids, static mixers, bends, junctions or the like, penstocks and draft tubes, reactors for chemical, petrochemical, and pharmaceutical applications, heat exchangers, cold boxes, incinerators and furnaces for waste disposal, static separators, and air intakes.

8 Claims, 2 Drawing Sheets

U.S. PATENT DOCUMENTS

| | | |
|---|---|---|
| 1,818,082 A | 8/1931 | Mott |
| 1,913,417 A | 6/1933 | Ulrich |
| 2,115,769 A | 5/1938 | Harris |
| 2,246,418 A | 6/1941 | Ward |
| 2,613,993 A | 10/1952 | Holden |
| 2,663,321 A | 12/1953 | Jantsch |
| 2,832,374 A | 4/1958 | November |
| RE24,783 E | 2/1960 | Humphrey |
| 3,117,821 A | 1/1964 | Mylting |
| 3,188,586 A | 6/1965 | Martin et al. |
| 3,201,723 A | 8/1965 | Martin et al. |
| 3,227,525 A | 1/1966 | Degeorges et al. |
| 3,345,590 A | 10/1967 | Wolfgang et al. |
| 3,578,075 A | 5/1971 | Winter |
| 3,606,780 A | 9/1971 | Nagahara |
| 3,610,289 A | 10/1971 | Moss et al. |
| 3,612,175 A | 10/1971 | Ford et al. |
| 3,647,187 A | 3/1972 | Dannewitz et al. |
| 3,713,784 A | 1/1973 | Pohl et al. |
| 3,719,207 A | 3/1973 | Takeda |
| 3,779,312 A | 12/1973 | Withers, Jr. et al. |
| 4,061,562 A * | 12/1977 | McKinney et al. ............ 208/61 |
| 4,317,353 A | 3/1982 | Geppelt et al. |
| T103,901 I4 | 2/1984 | Lupke |
| 4,499,055 A | 2/1985 | DiNicolantonio et al. |
| 4,595,058 A | 6/1986 | Nations |
| 4,827,074 A | 5/1989 | Suwa et al. |
| 4,995,450 A | 2/1991 | Geppelt et al. |
| 5,167,483 A | 12/1992 | Gardiner |
| 5,383,100 A | 1/1995 | Kikos |
| 5,553,976 A | 9/1996 | Korsgaard |
| 5,711,744 A | 1/1998 | Strawcutter et al. |
| 5,799,623 A | 9/1998 | Born et al. |
| 6,039,754 A | 3/2000 | Caro |
| 6,343,516 B1 | 2/2002 | Marrelli |
| 6,399,031 B1 | 6/2002 | Herrmann et al. |
| 6,419,885 B1 | 7/2002 | Di Nicolantonio et al. |
| 6,481,492 B1 | 11/2002 | Zhu et al. |
| 6,719,953 B2 | 4/2004 | Di Nicolantonio et al. |
| 6,776,194 B2 | 8/2004 | Houston et al. |
| 6,896,007 B2 | 5/2005 | Cymbalisty |
| 6,997,214 B2 | 2/2006 | Kuo |
| 7,114,524 B2 | 10/2006 | Houston et al. |
| 7,749,462 B2 | 7/2010 | Caro et al. |
| 2002/0043022 A1 | 4/2002 | Warren |
| 2002/0179166 A1 | 12/2002 | Houston et al. |
| 2002/0179494 A1 | 12/2002 | Doerksen |
| 2004/0000350 A1 | 1/2004 | Cymbalisty |
| 2004/0134557 A1 | 7/2004 | Cymbalisty |
| 2005/0131263 A1 | 6/2005 | Wolpert et al. |
| 2006/0102327 A1 | 5/2006 | Inui et al. |
| 2006/0137864 A1 | 6/2006 | Jakobi et al. |
| 2007/0021707 A1 | 1/2007 | Caro et al. |
| 2007/0156078 A1 | 7/2007 | Caro et al. |
| 2008/0030023 A1 | 2/2008 | Kurata et al. |
| 2008/0262599 A1 | 10/2008 | Caro et al. |

FOREIGN PATENT DOCUMENTS

| | | |
|---|---|---|
| CA | 1 119 853 A1 | 3/1982 |
| DE | 100 42 768 | 3/2002 |
| EP | 0 305 799 | 3/1989 |
| EP | 0 712 711 | 5/1996 |
| EP | 1 127 557 | 8/2001 |
| EP | 1 396 291 A1 | 3/2004 |
| FR | 2 248 015 | 5/1975 |
| GB | 499058 | 1/1939 |
| GB | 729618 | 5/1955 |
| GB | 969796 | 9/1964 |
| GB | 2192966 | 1/1988 |
| JP | 40-020630 Y1 | 7/1965 |
| JP | 57-027740 | 2/1982 |
| JP | 58-070834 A | 4/1983 |
| JP | 2129494 A | 5/1990 |
| JP | 09-248445 A | 9/1997 |
| JP | 2001-262159 A | 9/2001 |
| JP | 2002-533157 T | 10/2002 |
| KR | 1994-0000769 B1 | 4/1998 |
| RU | 2 110 554 | 5/1998 |
| SU | 531 993 | 10/1976 |
| WO | WO-86/04951 | 8/1986 |
| WO | WO-92/11931 | 7/1992 |
| WO | WO 95/09585 | 4/1995 |
| WO | WO-97/28232 | 8/1997 |
| WO | WO-97/28637 | 8/1997 |
| WO | WO-98/53764 | 12/1998 |
| WO | WO 98/56872 | 12/1998 |
| WO | WO-00/38591 | 7/2000 |
| WO | WO-01/18406 A1 | 3/2001 |
| WO | WO-02/47576 | 6/2002 |
| WO | WO-02/070626 | 9/2002 |
| WO | WO-02/093063 | 11/2002 |
| WO | WO-02/093064 | 11/2002 |
| WO | WO-02/098325 | 12/2002 |
| WO | WO-03/069209 | 8/2003 |
| WO | WO-2004/015237 A2 | 2/2004 |
| WO | WO-2004/083705 A1 | 9/2004 |
| WO | WO-2004/083706 A1 | 9/2004 |
| WO | WO-2005/075607 | 8/2005 |
| WO | WO-2006/018251 | 2/2006 |
| WO | WO-2006/032877 | 3/2006 |
| WO | WO-2007/104952 A2 | 9/2007 |

OTHER PUBLICATIONS

International Search Report for International Application No. PCT/GB2005/003632, dated Dec. 5. 2005.

Written Opinion for International Application No. PCT/GB2005/003632, dated Dec. 5. 2005.

European Search Report for Application No. 09 00 5580, dated May 13, 2009.

European Search Report for Application No. 09 00 1322, dated Jul. 3, 2009.

Canadian Office Action for Application No. 2,519,011, dated Jul 9, 2010.

Caro et al., "A Novel Approach to Ethylene Furnace Coil Design," 18th Annual Ethylene Producers' Conference (2006).

Caro et al., "A Novel Approach to Ethylene Furnace Coil Design," Presentation at the 18th Annual Ethylene Producers' Conference (2006).

English-language translation of Japanese Office Action for Application No. 2006-505985, dated Feb. 4, 2010.

European Search Report for Application No. 07024102, dated Apr. 24, 2008.

International Search Report for International Application No. PCT/GB2004/001663, dated Jun. 23, 2004.

International Search Report for International Application No. PCT/GB2007/000849, dated Jan. 23, 2008.

Matteo, "Mechanistic modeling of slug dissipation in helical pipes," Thesis submitted to the University of Tulsa Graduate School, Petroleum Engineering (2003).

Ramirez, "Slug dissipation in helical pipes," Thesis submitted to the University of Tulsa Graduate School, Mechanical Engineering (2000).

Written Opinion for Application No. PCT/GB2004/001170, dated Jun. 21, 2004.

Japanese Office Action for Application No. 2007-532949 dated Jul. 26, 2011.

Japanese Office Action for Application No. 2008-557828 dated Sep. 20, 2011.

* cited by examiner

OLEFIN PRODUCTION FURNACE HAVING A FURNACE COIL

The present invention relates to piping for use in industrial activities, which piping has a particular geometry.

Many industrial processes involve the transportation of fluids from one part of a plant or machine to another, and this is routinely achieved through the use of piping. The fluid can also be treated during its passage through the piping, for example by heating, irradiation, chemical reaction, and so on.

Pipes used in this way, and particularly those used to transport fluids over long distances, are normally straight, in that their centrelines are straight lines and the walls of the pipes are parallel to the centrelines.

However, it has been found that alternative geometries for pipes can be employed, which can provide a number of advantages over straight pipes. In particular, a pipe formed as a low-amplitude helix offers several significant advantages over a straight pipe.

By "low-amplitude helix", we mean that the pipe is formed such that its centreline follows a substantially helical path, and that the amplitude of the helix is equal to or less than one half of the internal diameter of the piping.

When fluid enters a piece of piping shaped as a helix in this way, swirl flow is established almost immediately. Swirl flow has a number of advantages over conventional flow. Turbulence, and associated pressure losses (and energy losses) can be reduced. In addition, as a result of mixing over the cross-section, the velocity profile of the flow across the pipe is more uniform (or blunter) than it would be with flow in a conventional pipe, with the swirling fluid tending to act as a plunger, scouring the pipe walls.

It has been found that swirl flow is generally established across the entire width of the pipe within a few pipe diameters of the entry into a low-amplitude helix. Further, the secondary motion and mixing over the cross-section associated with the swirl flow results in considerable mass, momentum and heat transfer in fluid within the core, and between fluid at the walls of the pipe and fluid within the core.

The term "amplitude of the helix" as used here refers to the extent of displacement of the centre line from a mean position to a lateral extreme. The amplitude is thus one half of the full lateral width of the helical centre line. The cross-sectional area of the tubing is normally substantially constant along its length, but it can vary depending on the particular characteristics required.

In low-amplitude helical piping of this type, where the amplitude of the helix is less than one half of the internal diameter of the pipe, there is a "line of sight" along the lumen of the piping. Even though the flow at the line of sight could potentially follow a straight path, it has been found that it generally has a swirl component.

For the purposes of this specification, the term "relative amplitude" of helical piping is defined as the amplitude divided by the internal diameter. Since the amplitude of the helical piping is less than or equal to one half of the internal diameter of the tubing, this means that the relative amplitude is less than or equal to 0.5. Relative amplitudes less than or equal to 0.45, 0.40, 0.35, 0.30, 0.25, 0.20, 0.15, 0.1 or 0.05 may be preferred. Smaller relative amplitudes provide a better use of available lateral space, in that the piping is not much wider overall than a normal straight pipe with the same cross-sectional area. Smaller relative amplitudes also result in a wider "line of sight", providing more space for the insertion of pressure gauges or other equipment along the piping. However, very small relative amplitudes can in some circumstances lead to reduced secondary motion and mixing.

With higher Reynolds numbers, smaller relative amplitudes may be used whilst swirl flow is induced to a satisfactory extent. This will generally mean that, for a given internal diameter, where there is a high flow rate a low relative amplitude can be used whilst still being sufficient to induce swirl flow.

The angle of the helix (or pitch, where the pitch is the length of one turn of the helix, and can be defined in terms of the internal diameter of the pipe) is also a relevant factor in influencing the flow. As with relative amplitude, the helix angle may be optimized according to the conditions, and in particular the viscosity, density and velocity of the fluid being carried by the piping. The helix angle is preferably less than or equal to 65°, more preferably less than or equal to 55°, 45°, 35°, 25°, 20°, 15°, 10° or 5°.

Generally speaking, for higher Reynolds numbers the helix angle may be smaller whilst satisfactory swirl flow is achieved, whilst with lower Reynolds numbers a higher helix angle will be required to produce satisfactory swirl. The use of higher helix angles for faster flows (with higher Reynolds numbers) will generally be undesirable, as there may be near wall pockets of stagnant fluid. Therefore, for a given Reynolds number (or range of Reynolds numbers), the helix angle will preferably be chosen to be as low as possible to produce satisfactory swirl. In certain embodiments, the helix angle is less than 20°.

Figure 1:
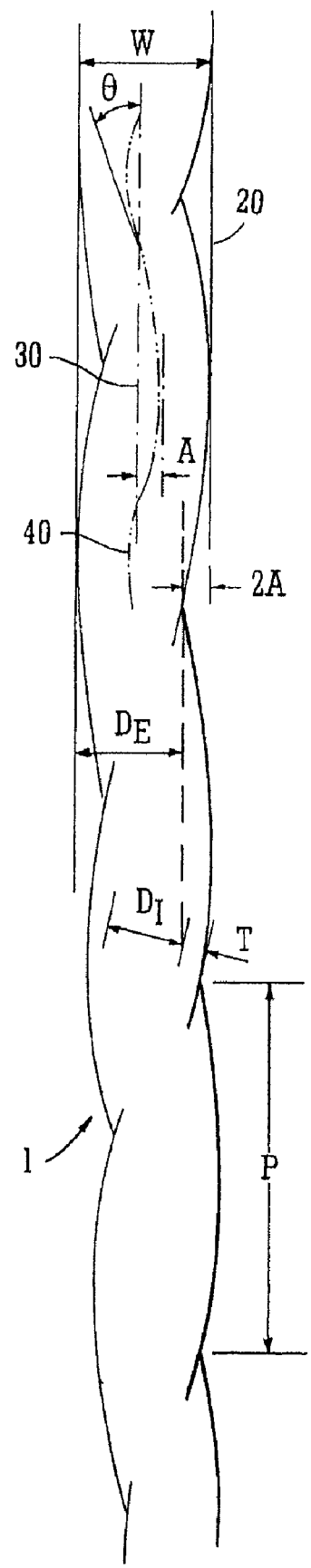
FIG. 1 shows a length of tubing having a low amplitude helical geometry.
Figure 2:
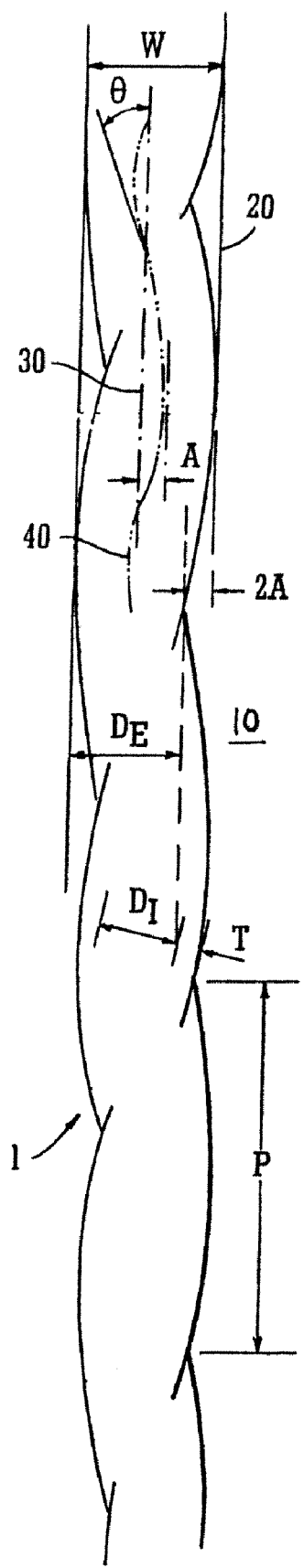
FIG. 2 shows an olefin production furnace 10 having a furnace coil in the form of tubing 1.

A length of tubing having a low-amplitude helical geometry is shown in FIG. 1. FIG. 1 shows a length of tubing having a low-amplitude helical geometry. FIG. 2 shows an olefin production furnace 10 having a furnace coil in the form of tubing 1. This tubing 1 has a circular cross-section, an external diameter $D_E$, an internal diameter $D_I$ and a wall thickness T. The tubing is coiled into a helix of constant amplitude A (as measured from mean to extreme), constant pitch P, constant helix angle .theta. and a swept width W. The tubing 1 is contained in an imaginary envelope 20 which extends longitudinally and has a width equal to the swept width W of the helix. The envelope 20 may be regarded as having a central longitudinal axis 30, which may also be referred to as an axis of helical rotation. The illustrated tubing 1 has a straight axis 30, but it will be appreciated that the central axis may be curved, or indeed may take any shape depending on requirements. The tubing has a centre line 40 which follows a helical path about the central longitudinal axis 30.

It will be seen that the amplitude A is less than half the tubing internal diameter $D_I$. By keeping the amplitude below this size, the lateral space occupied by the tubing and the overall length of the tubing can be kept relatively small, whilst at the same time the helical configuration of the tubing promotes swirl flow of fluid along the tubing. This also provides a relatively wide lumen along the tubing, which allows instruments, apparatus and the like to be passed down the tubing.

Use of low-amplitude helical piping can be beneficial to a large number of processes involving the movement or transport of fluid through pipes, the mixing of fluids within pipes, heat and mass transfer into or out of fluid within pipes, processes where deposition or contamination takes place within pipes and processes where chemical reactions take place within pipes. This use is applicable to either gases or liquids as a single phase or to a mixture of gases, liquids or solids in any combination as a multiphase mixture. Use of such piping can have significant economic impact.

As an example, the reduction in turbulence and the associated reduced pressure drop provided by swirl flow will, under appropriate conditions, enable reduced pumping costs.

This can be significant in the distribution of hydrocarbons through pipelines, including the crude oil and gas production process. For example, petroleum production risers and flowlines for use either onshore or offshore can include at least one portion which has low-amplitude helical geometry. The low-amplitude helical geometry improves the flow dynamics in the riser or flowline, in that it reduces flow turbulence through the flowline or riser, and thus reduces pressure loss.

The flowline or riser may be substantially vertical, substantially horizontal, or have a curved geometry, including an S-shape or a catenary shape. The flowline or riser may be rigid or flexible, or any combination of the two. The flowline or riser may be constructed from any combination of materials, and may include strengthening rings.

Similarly, production tubing for downhole use within oil, gas, water, or geothermal wells can use low-amplitude helical geometry. At least one portion of a well will contain production tubing with low-amplitude helical geometry. The benefits will include a reduction of flow turbulence, and reduced pressure loss.

Further, pipelines for the transportation of hydrocarbon can use low-amplitude helical geometry, and will enjoy the benefits of reduced flow turbulence and reduced pressure loss. Of course, pipelines for the transportation of other fluids, such as potable water, waste water and sewerage, slurries, powders, food or beverage products, or indeed any single phase or multiphase fluids, can also have a low-amplitude helical geometry and enjoy the same benefits.

Another area where the reduced pressure drop is of particular benefit is in the context of penstocks and draft tubes for hydropower applications. Reduced pressure loss will lead to increased power generation output, and even a small reduction in pressure drop can lead to a very large increase in power output over the life of the plant.

A reduced pressure drop is also important in the distribution of steam around power stations and other industrial plant. It is also important for the operation of chemical reactions where the pressure needs to be maintained at the lowest possible level to improve yields, including processes operated under vacuum, such as the production of olefins by pyrolysis and the production of styrene from ethyl benzene.

Mixing within pipes is important in many industries including the chemical, food, pharmaceutical, water and oil industries. It is often important that a small amount of active chemical is uniformly distributed in a large mass of other material. In some instances, this is known as dosing. Examples would be the addition of antioxidant to a variety of materials and foods, and the addition of chlorine or alkali to drinking water. The low-amplitude helix, because it delivers intrinsically good mixing, can reduce the amount of active chemical needed to ensure a sufficient concentration to achieve the desired purpose, and can ensure the absence locally of unacceptably high (or low) concentrations of additives.

Mixing is also important where it is required to bring together two or more large streams of fluids and ensure they do not remain separate. Mixing is furthermore important where it is beneficial to retain the fluid as a stable mixed phase (to prevent unwanted phase separation). This is important in the production of crude oil and gas, where the separation of gas creates slugging which reduces the capacity of pipelines and raises the expense of the operation. Indeed, a further major benefit of the use of low-amplitude helical geometry in petroleum production risers and flowlines, production tubing for downhole use, and pipelines for transportation of hydrocarbons and other fluids is the reduction of slug flow. The improved phase mixing is also significant in pipelines, as it tends to keep gas or air in the fluid, rather then having it collecting at the high points of the pipe and possibly causing airlocks.

Mixing is also important in the transport of solids by a liquid, as in the transport of sewage or the transport of minerals by pipeline in minerals extraction processes, to prevent the solids from settling out. This reduction of sedimentation (and of mineral and/or hydrocarbon precipitation) is also significant for petroleum production risers and flowlines, and production tubing for downhole use. Reduction of sedimentation is also important in hydropower applications. In addition, in petroleum production risers and flowlines, and production tubing for downhole use, the improved mixing reduces the risk of water drop-out.

As an example, static mixers for chemical dosing, and food, chemical, petrochemical and pharmaceutical processing, can use low-amplitude helical geometry. The benefits will include increased cross-mixing, and reduced blocking by sediment or precipitate. In addition, as discussed above, the low-amplitude helical geometry will also give a reduced mixer pressure-loss. Further, since there is a "line of sight" lumen along the low-amplitude helical portion, and there are no baffle plates or vanes as are commonly found in conventional mixers, there is increased ease of cleaning. These benefits will result in reduced maintenance and wear.

Further, the improved mixing (in particular thermal mixing) and reduced pressure loss which can be achieved using low-amplitude helical geometry is particularly beneficial in heat exchangers in power stations, refrigeration cold boxes, air separation cold boxes, and the like.

Low-amplitude helical piping can also be used to ensure complete mixing of components prior to reaction. This will ensure that reaction takes place more completely and that materials are used efficiently. Typically this would involve mixing gaseous or liquid reactants prior to passing them over a catalyst. However, it is specifically envisaged that this could be used for mixing fuel and air prior to passing them to an internal combustion engine. This would improve the efficiency of the internal combustion process and reduce the amount of unburnt or partially combusted fuel and fine solids passing to the atmosphere. This last improvement will also reduce the demand on and thus improve the performance of the catalytic converter downstream of internal combustion engines used in road transport.

Because the low-amplitude helical piping ensures helical (swirl) flow within pipes and generates a blunter velocity profile, the rate and uniformity of heat transfer to and from the fluid inside the pipe can be improved. In normal flow, the fluid at the centre of the pipe moves considerably faster than the fluid near the walls of the pipe, and so if the pipe is heated, the fluid near the walls will be heated to a greater degree than the fluid near the centre of the pipe.

However, as swirl flow has a blunter (and thus more uniform) velocity profile, it is less likely that parts of the fluid will be over- or under-heated, causing unwanted effects. The low-amplitude helical piping allows the same heat to be transferred with a lower differential temperature between the inside and the outside of the pipe.

This can be of particular benefit when a component is added to a fluid and treated in some way (such as heating). With poor mixing, the part of the mixture which is travelling quickly will be undertreated, and the part of the mixture which is travelling slowly will be overtreated; however, with the very good mixing provided by the low-amplitude helical geometry, this can be avoided, and more uniform treatment achieved.

This can be of serious economic benefit in furnaces such as olefin cracking furnaces, preheating furnaces for refinery thermal crackers or visbreakers, transfer line exchangers in olefin plants, heat exchangers in power stations, cold boxes for industrial refrigeration units, cold boxes for air separation units and refrigeration units generally.

The blunt velocity profile is also beneficial in hydropower applications. Turbines tend to work better when the velocity profile is blunter, and so use of the low-amplitude helical portions in hydropower applications can improve efficiency in this way. Additional advantages of swirl flow in the context of hydropower applications include reduced cavitation and reduced pipe stresses.

In addition, the "plunger" aspect of the swirl flow generated by the low-amplitude helical piping can provide significant economic benefits to those processes taking place in pipes where the deposition of fines or other solid particles on the inside wall of the pipe creates a barrier to heat transfer, or contaminates the fluid flowing through it, or reduces the flow of fluid through the pipe. Such fines or other solid particles can be present in the fluid, or can be created by a chemical reaction between the components of the fluid.

The use of low-amplitude helical piping is expected to significantly reduce such solid deposition on the internal walls of the pipe, thus extending its operating life before cleaning, reducing the amount of heat necessary, and reducing the pressure drop compared to the fouled pipe. Examples of where this effect could be economically significant are the transport of solids in liquid pipelines, and also the production of olefins by pyrolysis, where the deposition of coke on the inside of the furnace coils requires them to be taken out of service for cleaning (typically every 20 to 60 days). A similar effect occurs in other furnaces such as the preheat furnaces for refinery processes.

Further, the blunt velocity profile and the "plunger" aspect is extremely useful in the context of batch processing, which is common in pharmaceutical and food processing. Because of the blunt velocity profile, the axial dispersion of batches can be reduced and the peak concentration achieved much earlier than for conventional arrangements. These features are particularly beneficial if the batch sizes are small. In addition, the "plunger flow" helps to remove traces of a first component from the pipe walls after switching to a second component, which helps reduce the chance of contamination in batch processing. The time required to wash out the system may at least be reduced along with the quantity of fluid required to perform the washing-out.

Using low-amplitude helical piping can also have material economic significance where chemical reactions take place in pipes or tubes. The combination of improved mixing and more uniform heat transfer will improve yields and encourage the completion of reactions (including combustion). Improving yields will also reduce downstream separation costs. Example processes where this would be important include olefin production and similar gas phase reactions, such as the cracking of toluene to form benzene, and conversion of butene-1 to butadiene. Where such reactions involve the production of more than one molecule of product for each molecule of feedstock, the lower pressure drop in the reactor and its downstream pipework which can be achieved through the use of low-amplitude helical piping provides an additional benefit from the lower average pressure, because it will reduce the possibility of the product molecules recombining to form the feedstock or other unwanted byproducts. In addition, the use of low-amplitude helical geometry in reactors for chemical, petrochemical, and pharmaceutical applications, can lead to decreased carbon deposition in the reactor tubes, which is of particular importance in the petrochemical industry.

The improved mixing and more uniform heat transfer will also encourage the completion of combustion reactions without a large amount of excess air (over that required by the stoichiometry of the reactions). This is particularly important for incinerators or waste disposal furnaces, where it is necessary to ensure complete reaction to prevent chemicals and/or particles deleterious to the environment and human health escaping into the atmosphere. This could be prevented and complete combustion ensured by passing the combustion gases, while still hot, through a section of piping formed as a low-amplitude helix before passing them to the atmosphere. The generation of swirling flow through the furnace will increase the rate and efficiency of combustion, and the removal of waste.

When used with flows that include two or more different phases, the low-amplitude helical portion can furthermore be used to separate "in line" a mixture of fluids having different densities. The swirling created by the helical flow tends to displace higher density components of the mixture towards the tube walls and lower density components towards the centreline, as a result of the centrifugal effect. By means of suitable arrangements, higher (or lower) density components can be drawn off, leaving the remaining component present in increased concentration. The process can be repeated using further similar in-line static separators. This separation can be used to remove gases from liquids, and can therefore be used to help reduce slugging in the petrochemical industry in particular.

An approach similar to this can be used to either increase or decrease the concentration of particles in a flowing fluid. This will be achieved by drawing off fluid either from the vicinity of the tube centreline or from near to the tube walls.

In addition, the swirl flow caused by the low-amplitude helical portion can be used to remove particulate matter from a flow. This is of particular importance in, for example, air intakes. Air intakes are used in a great many situations where air is required, and in particular on vehicles where air is required for combustion and/or cooling. Helicopter air intakes in particular usually need dust separators, to prevent dust reaching the engine, but the swirl flow generated by the low-amplitude helical geometry can be used to separate the dust from the airflow without the need for separate filters.

Further, it has been found that swirl flow caused by a low-amplitude helical portion continues for some distance in a straight pipe downstream of the section. Thus, a section of the low-amplitude helical piping can be inserted upstream of structures such as bends, T- or Y-junctions, manifolds, and/or changes of conduit cross-section, where the swirl flow generated by the low-amplitude helical portion would suppress flow separation, stagnation and flow instability, with benefit to pumping costs and corrosion and wear in pipes. The particular benefits of the swirling flow at the bend, junction or the like will be reduced flow separation, leading to reduced pressure loss, reduced sedimentation and precipitation, reduced cavitation, and increased flow stability. Low-amplitude helical geometry pipes positioned before bends will also reduce particulate erosion within pipe bends, which can be of particular benefit with regard to fuel feed to power stations.

It will thus be clear to the skilled person that piping with a low-amplitude helical geometry can provide many advantages in a large number of situations.

The invention claimed is:

1. An olefin production furnace having a furnace coil, the furnace coil comprising a tube having a centerline which follows a substantially helical path, wherein the amplitude of the helix is equal to or less than one half of the internal diameter of the tube so as to provide a line of sight along the lumen of the tube.

2. An olefin production furnace as claimed in claim 1, wherein the tube has a substantially circular cross-section and an external diameter and wherein the tube is contained in an imaginary envelope which extends longitudinally and has a width equal to the swept width of the tube, the width of said envelope defining the lateral space occupied by the tube and being greater than the external diameter of the tube.

3. An olefin production furnace as claimed in claim 2, wherein the envelope has a central longitudinal axis about which the helical centerline of the tube follows a helical path, and wherein the central longitudinal axis is straight.

4. An olefin production furnace as claimed in claim 2, wherein the envelope has a central longitudinal axis about which the helical centerline of the tube follows a helical path, and wherein the central longitudinal axis is curved.

5. An olefin production furnace as claimed in claim 1, wherein the amplitude of the helix is less than or equal to 0.4 of the internal diameter of the tube.

6. An olefin production furnace as claimed in claim 1, wherein the angle of the helix is less than or equal to 55°.

7. A method of using an olefin production furnace as claimed in claim 1, for the production of olefins by pyrolysis.

8. A method of using an olefin production furnace as claimed in claim 2, for the production of olefins by pyrolysis.

* * * * *